United States Patent [19]

Platt et al.

[11] 4,068,064

[45] Jan. 10, 1978

[54] METHOD FOR PREPARING MONOVINYL AROMATIC MONOMER-ACRYLONITRILE COPOLYMER

[75] Inventors: Alan E. Platt; Robert J. Russell, both of Midland, Mich.

[73] Assignee: The Dow Chemical Company, Midland, Mich.

[21] Appl. No.: 693,067

[22] Filed: June 4, 1976

Related U.S. Application Data

[63] Continuation-in-part of Ser. No. 643,586, Dec. 22, 1975, abandoned, which is a continuation-in-part of Ser. No. 575,892, May 8, 1975, abandoned.

[51] Int. Cl.$^2$ .................. C08F 4/00; C08F 2/00; C08F 4/32; C08F 220/44
[52] U.S. Cl. ........................... 526/194; 526/64; 526/218; 526/224; 526/227; 526/232; 526/342
[58] Field of Search ............... 526/342, 227, 218, 232, 526/194

[56] References Cited

U.S. PATENT DOCUMENTS

| | | | |
|---|---|---|---|
| 2,739,142 | 3/1956 | Jones et al. | 526/89 |
| 2,769,804 | 11/1956 | Hanson | 526/65 |
| 2,941,985 | 6/1960 | Amos et al. | 526/342 X |
| 2,989,517 | 6/1961 | Hanson et al. | 526/60 |
| 3,192,189 | 6/1965 | Nakajima et al. | 528/488 |
| 3,325,457 | 6/1967 | Finestone et al. | 526/89 X |
| 3,634,300 | 1/1972 | Fischer et al. | 526/68 |
| 3,738,972 | 6/1973 | Moriyama et al. | 526/342 |
| 3,772,257 | 11/1973 | Bochum et al. | 526/75 |
| 3,813,369 | 5/1974 | Latinen | 526/68 |
| 3,891,609 | 6/1975 | Wolfe et al. | 526/342 X |

OTHER PUBLICATIONS

Encyclopedia of Polymer Sci. & Tech., vol. 13, pp. 191–192, John Wiley & Sons, 1970.

*Primary Examiner*—Herbert J. Lilling
*Attorney, Agent, or Firm*—R. B. Ingraham

[57] ABSTRACT

Improved monovinyl aromatic monomer-acrylonitrile copolymers are prepared by polymerizing at temperatures above 80° C in the presence of certain free radical initiators, the resultant polymers are prepared at high rates of conversion, have relatively high heat distortion temperatures, have a low oligomer content and generate relatively little additional acrylonitrile under fabrication conditions.

4 Claims, No Drawings

METHOD FOR PREPARING MONOVINYL AROMATIC MONOMER-ACRYLONITRILE COPOLYMER

The present application is a continuation-in-part of application Ser. No. 643,586 filed Dec. 22, 1975 and now abandoned which is a continuation-in-part of application Ser. No. 575,892 filed May 8, 1975 and now abandoned.

Monovinyl aromatic monomer-acrylonitrile copolymers typified by styrene-acrylonitrile copolymers have found wide use in a number of areas. Low acrylonitrile copolymers, that is polymers containing less than 50 weight percent of acrylonitrile and particularly those containing from about 20 to 30 weight percent acrylonitrile have found wide application in the fabrication of containers, oftentimes food containers. Such low acrylonitrile copolymers offer substantial resistance to stress cracking under the influence of fats and oils and offer a substantial increase in solvent resistance over containers made from polystyrene. Such polymers are fabricated by extrusion processes, gas pressure forming processes, injection molding processes and the like. In instances where a relatively high barrier to the passage of oxygen, carbon dioxide and moisture vapor is desired, polymers are employed which contain 50 weight percent or more acrylonitrile, styrene or styrene and rubber being employed as the remaining components. Such resinous compositions are often referred to as barrier resins and contain from about 50 to about 75 weight percent or more acrylonitrile. Acrylonitrile copolymers, particularly with those with monovinyl aromatic monomers such as styrene, oftentimes show an undesirable tendency to turn yellow on heat fabrication and exhibit heat distortion temperatures less than are generally deemed desirable, particularly when the polymers are prepared at temperatures sufficient to permit a commercially desirable rate of polymerization, for example, a conversion of monomer to polymer of about 40 percent per hour. It is desirable in the preparation of alkenyl aromatic monomer-acrylonitrile copolymer to control the molecular weight to an extent sufficient that the material readily is processed in conventional heat fabrication equipment. In general, the lower the temperature employed for polymerization, the lower is the reaction rate, that is conversion of monomer to polymer, the molecular weight of the polymer produced increases and the ease of fabrication of the polymer decreases. Recently, there was published in the *United States Federal Register*, Volume 32, No. 213, Monday, Nov. 4, 1974, pages 38907–38909, proposed regulations governing extractable acrylonitrile content of styrene-acrylonitrile resins which are employed in contact with food. Such acrylonitrile levels are below those of most commercial resins.

It would be desirable if there were available an improved acrylonitrile resin having an ease of fabrication, thermal stability and a low extractable acrylonitrile content.

It would also be desirable if there were available an improved process for the preparation of monovinyl aromatic monomer-acrylonitrile copolymer resins which would provide a thermally stable polymer at injection molding temperatures.

It would also be desirable if there were available an improved process for the preparation of styrene-acrylonitrile resins which would permit high conversion rates, a resin having high heat distortion temperatures, a low acrylonitrile content, both before and after fabrication.

The benefits and other advantages in accordance with the present invention are achieved in a monovinyl aromatic monomer-acrylonitrile copolymer comprising from about 95 to 25 parts by weight of a monovinyl aromatic monomer, from about 5 to 75 parts by weight of acrylonitrile, the copolymer having a weight average of from about 50,000 to about 300,000 molecular weight units as determined by gel permeation chromatography employing a polystyrene standard, the copolymer containing not more than $7.5 \times 10^{-5}$ parts by weight per part of copolymer of free acrylonitrile and not more than $7 \times 10^{-3}$ parts by weight per part of copolymer of oligomers of styrene and acrylonitrile with the further limitation that the polymer is prepared by polymerization at a temperature in excess of 80° C.

Also contemplated within the scope of the present invention is a method for the preparation of a monovinyl aromatic monomer-acrylonitrile copolymer, steps of the method comprising providing a polymerizable stream, the stream comprising from 5 to 75 parts by weight of acrylonitrile and from 95 to 25 parts by weight of a monovinyl aromatic monomer, the stream containing from about $5 \times 10^{-5}$ to $1 \times 10^{-2}$ parts by weight per part by weight of the polymerizable stream of a free radical initiating catalyst, the catalyst having a half-life of about 1 hour at a temperature in the range of 80° C to 180° C, maintaining the stream at a polymerization temperature sufficient to cause at least from 20 to 200 percent conversion of the monomer to polymer per hour.

Also contemplated within the scope of the present invention is an injection molded monovinyl aromatic monomer-acrylonitrile copolymer article, the article having as a principal component thereof a copolymer of from about 5 to 75 parts by weight of acrylonitrile and from about 95 to 25 parts by weight of alkenyl aromatic resinous monomer copolymerized therewith, the article containing not more than 75 parts of residual acrylonitrile per million parts of resin and not more than 0.7 parts of oligomers per 100 parts of resin.

By the term "monovinyl aromatic monomer" is meant a monovinyl aromatic compound having the general formula:

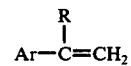

wherein "Ar" represents an aromatic hydrocarbon radical, or an aromatic halohydrocarbon radical of the benzene series, and "R" is hydrogen or the methyl radical. Examples of such monovinyl aromatic monomers are styrene, orotho-methylstyrene, meta-methylstyrene, para-methylstyrene, ar-ethylstyrene, ar-vinylxylene, ar-chlorostyrene, or ar-bromostyrene; and the like.

Polymers in accordance with the present invention are readily prepared employing monomers of commercial purity. Similarly, catalysts and solvents of commercial purity are also satisfactory. If it is desired to obtain a polymer of generally uniform composition, it is desirable to either control the monomer composition, that is, the ratio of the monovinylaromatic monomer to the acrylonitrile or to employ polymerization techniques as described in U.S. Pat. Nos. 2,739,142, 2,769,804 and 2,989,517. The difference in reactivity between styrene and acrylonitrile is well recognized and discussed in

*Encyclopedia of Polymer Science and Technology*, Vol. 13, Pages 191 and 192, John Wiley and Sons 1970. In carrying out a polymerization in accordance with the present invention, it is essential that the temperature of the polymerization be maintained in excess of 80° C and below about 180° C during conversion of a major amount of the monomer to polymer. Beneficially, the temperature is maintained between about 110° C and about 150° C. If temperatures lower than the foregoing are employed, generally undesirable conversion rates are obtained and the molecular weight of the product tends to be higher than that desirable for easily fabricated resins. Generally, if the temperature is in excess of the upper limits hereinbefore set forth, undesirably low molecular weight resins are obtained and temperature control of the process becomes quite difficult. During the terminal portion of the polymerization, it is sometimes desirable to employ higher temperatures. Generally, devolatilization of the polymerization mixture is done at temperatures of 200° to 260° C.

Generally, it is desirable to maintain a rate of conversion of at least 20 percent per hour and beneficially under 200 percent per hour. If rates exceed 200 percent per hour, control of the reaction is oftentimes difficult. It is usually desirable to at least initiate polymerization as a mass or solvent polymerization system in order to maintain a reaction mass having a sufficiently low viscosity that adequate heat transfer can be maintained and reduce the energy required to agitate or pump the reaction mixture. The reaction may be completed in a mass or solution system or completed in a suspension system. Usually such solvents are employed at levels up to 50 percent of the reactor contents, however, for most applications it is desirable to maintain a solvent level from about 5 to about 20 percent by weight. A wide variety of solvents may be employed, however, particularly desirable for polymers containing less than 50 weight percent acrylonitrile is ethylbenzene and for those polymers containing over 50 weight percent acrylonitrile, methylethyl ketone can be employed with benefit. Other solvents which are useful include: cyclohexanone, dimethylformamide, and dimethylsulfoxide.

Polymerization in accordance with the present invention is readily carried out employing the conventional reactors which are suitable for the preparation of styrene acrylonitrile resins. Stirred tube stratifying polymerizers, recirculating coil polymerizers, so-called boiling reactors, where cooling is obtained by condensing monomer vapor, are all used with benefit.

Polymerization critically is initiated using an initiator having a half-life of 1 hour at a temperature between 80° C and 180° C. Suitable initiators for the practice of the present invention include:

|  | 1 hour ½ Life Temperature ° C |
|---|---|
| Lauroyl Peroxide | 80 |
| Decanoyl Peroxide | 80 |
| Azobisisobutylronitrile | 85 |
| t-Butyl Peroctoate | 92 |
| Benzoyl Peroxide | 91 |
| t-Butyl Perbenzoate | 125 |
| t-Butyl Peracetate | 120 |
| 1,1-Bis(Di-t-Butylperoxy)-Cyclohexane | 115 |
| 4-Methyl,1,1-Bis(Di-t-Butylperoxy)Cyclohexane | 115 |
| Di-t-Butyl Peroxide | 149 |
| Diphenyl, di-t-butyl Peroxy Silane | 156 |
| Dimethyl, di-t-butyl Peroxy Silane | 180 |

-continued

|  | 1 hour ½ Life Temperature ° C |
|---|---|
| α,α' Di-t-butyl Peroxy 1,4 Di-isopropyl-Benzene | 137 |
| 1,1-Bis(t-Butyl Peroxy)-3,3,5 Trimethyl Cyclohexane | 112 |
| Di-amyl Peroxide | 135 |

In order that the desirable characteristics be obtained and polymers be prepared in accordance with the present invention, the ratio of initiator induced polymerization initiation to thermally induced polymerization initiation should be in excess of 1.3 and preferably in the range of 2 to 10. The ratio of initiator induced polymerization initiation to thermally induced polymerization initiation for the purposes of the foregoing is considered to be the rate of conversion at a given temperature employing catalyst divided by the rate of polymerization of a like system wherein catalyst or initiator has been omitted. If there is excess of thermally produced polymerization initiation, a thermally unstable or less stable polymer composition is produced.

Oligomers are formed during the copolymerization of styrene with acrylonitrile. They are believed to be compounds having the general formula $A_xS_y$ where: A represents an acrylonitrile unit, S represents a styrene unit, and $x$ and $y$ are integers each having the values 0, 1, 2 or 3, although at present, all such combinations of $x$ and $y$ are not known. The molecular weight of these oligomers range between 157 and 312. During the thermally initated copolymerization of styrene with acrylonitrile, the oligomers typically account for about 1.5 weight percent of the polymer formed. The presence of these oligomers in the polymeric material is generally highly undesirable since they cause a reduction in heat distortion temperature; and they are thermally unstable, yielding acrylonitrile under conditions typically used for fabricating useful articles out of the polymers. Their presence in the polymers is detectable using gas-liquid chromatography from which a quantitative analysis may be made. The present invention minimizes oligomer content of the product.

The following examples serve to illustrate the invention but should not be considered limiting.

EXAMPLE 1

A recirculating coil reactor is fed a stream consisting of 75 parts by weight styrene, 25 parts by weight acrylonitrile, 15 parts by weight ethylbenzene, 350 parts per million based on the combined weight of styrene, acrylonitrile and ethylbenzene of bis(ditertiarybutylperoxy)-cyclohexane and 500 parts per million based on the combined weight of styrene acrylonitrile and ethylbenzene of n-butyl-mercaptan. The temperature of the feedstream is about 20° C. The recirculating coil reactor and contents were maintained at a temperature of 130° C and recirculated at a rate of about 1.6 coil volumes per minute. The reactor is operated hydraulically full and under a pressure of about 150 PSIG. Effluent was removed from the coil at about 50 weight percent solids and passed to a continuous devolatilizer operating under pressure of about 325 millimeters of mercury absolute. The stream was subsequently passed to a second devolatilizer operating at a temperature of 245° C and a pressure of about 30 millimeters of mercury absolute. The molecular weight was determined by gel permeation chromatography employing a polystyrene standard as set forth in K. H. Altgelt and J. C. Moore, *Polymer Fractionation,* edited by M. J. R. Cantow, Chapter B.4, Academic Press 1967, and had an average molecular weight of 150,000. The polymer contained about 36 parts per million of acrylonitrile and had an oligomer content of 0.1 percent as determined using a gas-liquid chromatograph. The polymer was evaluated for thermal stability by placing one gram of the polymer in a glass tube and sealing the tube under a pressure of about 20 millimeters of mercury absolute. The sealed tube was then placed in a Wood's metal bath at 275° C for about 1 hour. At the end of an hour, the sealed tube was removed from the bath, cooled to room temperature and the contents analyzed for acrylonitrile monomer using a gas-liquid chromatograph, 35 parts per million of acrylonitrile and an oligomer content of 0.1 percent were indicated showing essentially no increase in acrylonitrile under temperature conditions approximating those encountered in an injection molding machine. The Vicat heat distortion temperature of the polymer was determined on a compression molded sample, the value was 235° F. When the foregoing procedure was repeated with the exception that 1500 parts per million of α-methylstyrene dimer was employed in place of the 500 parts per million of n-butylmercaptan, the molecular weight of the polymer obtained was 190,000 molecular weight units. The polymer contained 50 parts per million of acrylonitrile. A sample of the polymer was heated for 1 hour at 275° C in a sealed glass tube, was later analyzed to show an acrylonitrile level of 58 parts per million, an increase of acrylonitrile content of 16 percent and an oligomer content of ½ percent.

For comparative purposes, a third polymerization was carried out wherein the peroxy compound and α-methylstyrene dimer and n-butylmercaptan were omitted. The polymerization was carried out at a temperature of 155° C. The polymer had a molecular weight of 190,000 molecular weight units and contained 50 parts per million acrylonitrile and 1.5 weight percent oligomer. A sample was subjected to 1 hour at 275° C under a pressure of 20 millimeters of mercury absolute in a sealed glass tube and was subsequently analyzed by gas-liquid chromatography to indicate an acrylonitrile content of 150 parts per million, an increase of about 200 percent.

EXAMPLE 2

A series of polymerizations were carried out wherein various mixtures of styrene-acrylonitrile and ethylbenzene were polymerized and two polymerizations using styrene and methacrylonitrile. In two instances the styrene and acrylonitrile were polymerized in the presence of a polybutadiene rubber and mineral oil. Polymerizations were carried out using a large coil reactor, a small coil reactor, ebulliently cooled reactor, a stirred plug-flow reactor and polymerization in an ampule. With the exception of the ampule polymerizations, all were carried out using continuous feed and continuous take-away of the product. With the exception of the stirred plug-flow reactor, all polymerizations were carried out at the indicated temperature. In the stirred plug-flow reactor polymerization temperature varied between the indicated limits wherein the low temperature was a temperature of the first polymerization zone and the highest temperature was the temperature of the ninth polymerization zone. The temperatures of zones 2 through 8 were progressively increasing. The percent solids is determined on the effluent from the polymerizer prior to devolatilization of about 200° C under a pressure of 1 millimeter of mercury absolute over a period of 30 minutes. The polymerization rate as expressed in percent conversion per hour is obtained by dividing the percent solids by the number of hours or fraction of an hour required for polymerization. Additives are shown as either weight percent or parts per million by weight. The polymerization schedules and compositions are set forth in Table 1.

TABLE 1
PREPARATION OF MATERIALS

| Exp No. | AN(a) in Product Wt % | Catalyst Type | Catalyst Amount ppm | Polym'n Temp °C | Reactor(i) Type | Feed Mixture STY(j) | Feed Mixture AN | Feed Mixture EB(k) | Reaction Time, Min | Solids % | Rate %/Hr | Additives Type | Additives Amount |
|---|---|---|---|---|---|---|---|---|---|---|---|---|---|
| 1 | 7 | BPC(b) | 200 | 130 | 1 | 85.5 | 4.5 | 10.0 | 84 | 33 | 24 | — | — |
| 2 | 10 | BPC | 400 | 130 | 1 | 82.8 | 7.2 | 10.0 | 79 | 39.7 | 34 | — | — |
| 3 | 25 | BPC | 350 | 130 | 2 | 65.0 | 20.0 | 15.0 | 55 | 50 | 5 | αMSD | 0.2% |
| 4 | 25 | BPC | 350 | 130 | 2 | 65.0 | 20.0 | 15.0 | 52 | 50 | 58 | tBuSH | 500 ppm |
| 5 | 25 | BPC | 350 | 128 | 3 | 64.7 | 19.9 | 15.9 | 60 | 62 | 62 | NBuSH | 500 ppm |
| 6 | 25 | BPC | 100 | 128 | 3 | 65.5 | 19.5 | 15.0 | 55 | 35 | αMSD | 0.4% | |
| 7 | 25 | AIBN(c) | 500 | 140 | 4 | 64.0 | 21.0 | 15.0 | 60 | 51 | 51 | — | — |
| 8 | 27 | BPC | 300 | 100–170 | 5 | 48.3 | 21.7 | 21.2 | 450 | 61 | 8.1 | Rubber Mineral Oil | 8.0% 0.8% |
| 9 | 45 | BPP(e) | 500 | 140 | 4 | 34.0 | 51.0 | 15.0 | 60 | 74 | 74 | — | — |
| 10 | 50 | BPC | 350 | 140 | 3 | 26.2 | 56.8 | 17.0 | 186 | 38 | 12 | αMSD | 0.1% |
| 11 | 65 | DtBP(f) | 250 | 130 | 4 | 21 | 64 | 15 | 60 | 74 | 74 | — | — |
| 12 | 65 | tBPB(g) | 350 | 120 | 4 | 13 | 72 | 15 | 60 | 41 | 41 | — | — |
| 13 | 25 | —(h) | — | 155 | 3 | 64.3 | 19.8 | 16.4 | 60 | 54 | 54 | — | — |
| 14 | 25 | — | — | 146 | 3 | 65.5 | 19.5 | 15.0 | 50 | 30 | 47 | — | — |
| 15 | 27 | — | — | 118–168 | 5 | 48.3 | 21.7 | 21.2 | 450 | 62 | 8.3 | Rubber Mineral Oil | 8.0% 0.8% |
| 16 | 32 | — | — | 161.5 | 2 | 39.8 | 39.8 | 20.4 | 159 | 48 | 18 | — | — |
| 17 | 35 | Bz$_2$O$_2$(d) | 500 | 130 | 4 | 34.0 | 51.0 | 15.0 | 60 | 44 | 44 | — | — |
| 18 | 40.8 | — | — | 155.5 | 2 | 38.9 | 4.9 | 20.2 | 184 | 40 | 13 | — | — |
| 19 | 51.8 | — | — | 153.5 | 2 | 26.2 | 56.8 | 17.0 | 186 | 38 | 12 | — | — |
| 20 | 59 | — | — | 153.5 | 2 | 20.8 | 68.4 | 10.8 | 216 | 30 | 8 | — | — |
| 21 | 78 MAN(l) | — | — | 140 | 4 | 10 | 90 MAN | 0 | 336 | 29 | 5 | — | — |
| 22 | 78 | DtBP | 500 | 140 | 4 | 10 | 90 MAN | 0 | 336 | 41 | 7 | — | — |

TABLE 1-continued

PREPARATION OF MATERIALS

| Exp. No. | AN(a) in Product Wt % | Catalyst Type | Amount ppm | Polym'n Temp ° C | Re-actor(i) Type | Feed Mixture STY(j) | AN | EB(k) | Reaction Time, Min | Solids % | Rate %/Hr | Additives Type | Amount |
|---|---|---|---|---|---|---|---|---|---|---|---|---|---|
| | MAN | | | | | | MAN | | | | | | |

(a) Acrylonitrile (AN)
(b) 1,1-Bis(t-butylperoxy)cyclohexane (BPC)
(c) Azobisisobutyronitrile (AIBN)
(d) Benzoyl peroxide (Bz$_2$O$_2$)
(e) Ethyl-3,3-bis(t-butylperoxy)butyrate (BPP)
(f) Dibutyl peroxide (DtBP)
(g) t-butyl perbenzoate (tBPB)
(h) none (—)
(i) 1 = small coil reactor 2 = large coil reactor 3 = ebulliently cooled reactor 4 = ampoule 5 = stirred plug flow reactor
(j) Styrene (STY)
(k) Ethylbenzene (EB)
(l) Methacrylintirle (MAN)

It should be noted that Examples 1 through 12 and 17 are within the scope of the present invention. The remaining examples are provided for comparative purposes only. The amount of acrylonitrile copolymerized in the product was determined and the volatile materials such as ethylbenzene styrene dimers and trimers were also determined. In most cases, the weight average and number average molecular weight were determined and in four instances the solution viscosity was determined which is a solution of 10 weight percent polymer in methylethyl ketone at 25° C. Vicat heat distortion was determined on all polymers except those containing methacrylonitrile. The residual acrylonitrile was determined before and after thermal stability testing in the manner of Example 1. The results are set forth in Table 2.

cent acrylonitrile and 50 to 70 weight percent acrylonitrile.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a monovinyl aromatic monomer-acrylonitrile copolymer, steps of the method comprising providing a polymerizable stream,

TABLE 2

PROPERTIES OF MATERIALS PREPARED ACCORDING TO TABLE 1

| Exp. No. | AN in Product Wt. % | Wt. % Residuals EB | STY | Dimers | Trimers | Molec. Wt. $M_w$(a) | $M_n$(b) | Sol'n(c) Visc. cps | Vicat H.D. ° F | Residual Acrylonitrile Before ppm(d) | After ppm | % Increase |
|---|---|---|---|---|---|---|---|---|---|---|---|---|
| 1 | 7 | 0.04 | 0.33 | 0.01 | 0.58 | 263,000 | 119,000 | — | 223 | 9 | 11 | 22 |
| 2 | 10 | 0.03 | 0.21 | 0.02 | 0.27 | 250,000 | 109,000 | — | 226 | 12 | 13 | 8 |
| 3 | 25 | 0.05 | 0.14 | 0.13 | 0.55 | 213,000 | 87,000 | — | 232 | 49 | 58 | 16 |
| 4 | 25 | 0.03 | 0.08 | 0.00 | 0.10 | 151,000 | 71,000 | — | 236 | 36 | 35 | −3 |
| 5 | 25 | 0.01 | 0.04 | 0.03 | 0.22 | 141,000 | 68,000 | 8.5 | 233 | 9 | 29 | 222 |
| 6 | 25 | 0.02 | 0.06 | 0.02 | 0.54 | 161,000 | 75,000 | 10.7 | 232 | 44 | 60 | 36 |
| 7 | 25 | 0.00 | 0.00 | 0.00 | 0.40 | 211,000 | 96,000 | — | 233.6 | 3 | 32 | 967 |
| 8 | 27 | 0.02 | 0.00 | 0.01 | 0.38 | 184,000 | 70,000 | — | 236 | 5 | 9 | 80 |
| 9 | 45 | 0.01 | 0.00 | 0.00 | 0.02 | 141,000 | 68,000 | — | 244 | 8 | 18 | 125 |
| 10 | 50 | 0.01 | 0.00 | 0.01 | 0.03 | 55,000 | 29,000 | — | 235.5 | 24 | 37 | 54 |
| 11 | 65 | 0.40 | 0.00 | 0.00 | 0.09 | NA | NA | — | 325 | 6 | 12 | 100 |
| 12 | 65 | 0.13 | 0.00 | 0.00 | 0.04 | NA | NA | — | 252.5 | 8 | 13 | 63 |
| 13 | 25 | 0.03 | 0.07 | 0.00 | 1.07 | 177,000 | 82,000 | 11.1 | 229 | 57 | 113 | 98 |
| 14 | 25 | 0.02 | 0.07 | 0.00 | 1.10 | 209,000 | 100,000 | 14.9 | 230 | 74 | 119 | |
| 15 | 27 | 0.12 | 0.04 | 0.02 | 1.98 | NA | NA | — | 223 | 5 | 48 | 860 |
| 16 | 32 | 0.02 | 0.01 | 0.01 | 1.61 | 137,000 | 68,000 | — | 222.5 | 30 | 190 | 533 |
| 17 | 35 | 0.23 | 0.05 | 0.63 | 0.19 | 200,000 | 97,000 | — | 243 | 50 | 54 | 8 |
| 18 | 40.8 | 0.01 | 0.01 | 0.00 | 1.29 | 104,000 | 53,000 | — | 229.8 | 45 | 157 | 248 |
| 19 | 51.8 | 0.01 | 0.00 | 0.00 | 1.28 | 68,000 | 41,000 | — | 229 | 49 | 85 | 73 |
| 20 | 59 | 0.01 | 0.00 | 0.00 | 1.31 | NA | NA | — | 231 | 20 | 110 | 450 |
| 21 | 78 MAN | 0.00 | 0.00 | 0.00 | 0.19 | 156,000 | 89,000 | — | NA | 130 | 2108 Methacrylonitrile | 1520 |
| 22 | 78 MAN | 0.00 | 0.00 | 0.00 | 0.08 | 109,000 | 64,000 | — | NA | 150 | 1917 Methacrylonitrile | 1180 |

(a)weight average molecular weight ($M_w$)
(b)number average molecular weight ($M_n$)
(c)viscosity of 10 wt. % solution in methyl ethyl ketone at 25° C (Sol'n Visc. cps)
(d)per million prts of sample (ppm)

In a manner similar to the foregoing illustrations, other monovinyl aromatic monomers and acrylonitrile copolymers are readily copolymerized to provide resins of low oligomer content, high heat stability that is a low tendency to generate acrylonitrile under fabrication conditions. Such resins are readily prepared containing from 50 to 75 weight percent acrylonitrile and most beneficially in the ranges of about 20 to 35 weight perthe stream comprising from 5 to 75 parts by weight of acrylonitrile and from 95 to 25 parts by weight of a monovinyl aromatic monomer, the stream containing from about $5 \times 10^{-5}$ to $1 \times 10^{-2}$ parts by weight per part by weight of the polymerizable stream of a free radical initiating catalyst, the catalyst having a half-life of about 1 hour at a temperature in the range of 80° C to 180° C, maintaining the stream at a polymerization temperature in excess of 80° C sufficient to cause at least from 20 to 200 percent conversion of the monomer to polymer per hour wherein the copolymer contains not more than $7.5 \times 10^{-5}$ parts by weight per part of copolymer of free acrylonitrile and not more than $7 \times 10^{-3}$ parts by weight, per part of copolymer, of co-oligomers of stryene and acrylonitrile.

2. The method of claim 1 wherein the monomer stream contains from about 20 to 35 parts by weight of acrylonitrile.

3. The method of claim 1 wherein the polymerizable stream contains from about 50 to 75 parts by weight acrylonitrile.

4. A method for the preparation of a monovinyl aromatic monomer-acrylonitrile copolymer, steps of the method comprising providing a polymerizable stream, the stream comprising from 5 to 75 parts by weight of acrylonitrile and from 95 to 25 parts by weight of a monovinyl aromatic monomer, the stream containing from about $5 \times 10^{-5}$ to $1 \times 10^{-2}$ parts by weight per part by weight of the polymerizable stream of a free radical initiating catalyst, the catalyst having a half-life of about 1 hour at a temperature in the range of 80° to 180° C, maintaining the stream at a polymerization temperature sufficient to cause at least from 20 to 200 percent conversion of the monomer to polymer per hour, the polymerization being conducted at a temperature in excess of 80° C to provide a polymer having a desirably high heat-distortion temperature and little tendency to generate acrylonitrile on heat fabrication.

* * * * *